United States Patent
Shiao

[11] Patent Number: 6,087,824
[45] Date of Patent: Jul. 11, 2000

[54] NAIL LOCATING DEVICE WITH MAGNET SUPPORTING INDICATOR ROD MOUNTED IN A BALL SOCKET

[76] Inventor: Hsuan-Sen Shiao, No. 15-1, Lane 369, Min-Chuan Rd., Taichung City, Taiwan

[21] Appl. No.: 09/048,892

[22] Filed: Mar. 27, 1998

[51] Int. Cl.[7] .............................. G01R 33/00; G01D 5/12; G01V 3/165
[52] U.S. Cl. .............................. 324/67; 324/228; 116/204
[58] Field of Search .............................. 324/67, 228, 259, 324/326, 345; 116/204; 273/141 A; 434/301; 446/129; 200/61.09, 61.1

[56] References Cited

U.S. PATENT DOCUMENTS

| | | | |
|---|---|---|---|
| 2,346,773 | 4/1944 | McBride | 324/67 |
| 2,600,857 | 6/1952 | De La Mater | 324/67 |
| 2,723,369 | 11/1955 | Brummett | 324/228 X |
| 3,845,384 | 10/1974 | Stoutenberg et al. | 324/228 |

*Primary Examiner*—Gerard Strecker
*Attorney, Agent, or Firm*—Foley & Lardner

[57] ABSTRACT

A nail locating device includes a seat, a coupling member and an indicating rod. The seat is adapted to be moved on a surface of a board into which a nail has been driven, and has an open upper end portion and an open lower end portion. The seat further has an intermediate portion between the upper and lower end portions and is formed with a ball socket therein. The coupling member has a ball portion hinged to the seat in the ball socket. The indicating rod is received in the seat and extends from the upper end portion, through the ball portion of the coupling member, and into the lower end portion of the seat. The indicating rod has a bottom end provided with a magnet that is adapted to be attracted to the nail such that the indicating rod pivots in the seat due to attraction of the magnet to the nail in order to indicate the location of the nail in the board.

10 Claims, 5 Drawing Sheets

NAIL LOCATING DEVICE WITH MAGNET SUPPORTING INDICATOR ROD MOUNTED IN A BALL SOCKET

BACKGROUND OF THE INVENTION

1. Field of the Invention

The present invention relates to a nail locating device which permits location of a magnetically attractive nail on a non-magnetically attractive board in a fast and convenient manner.

2. Description of the Related Art

A nail locating device is used for locating a nail that was driven into a board when removing the nail from the board. Boards used for decorating a building interior or a room place are sometimes covered with wallpaper or coated with paint such that the nails driven into the same cannot be found easily. When the boards are to be dismantled, the nails driven thereinto should be removed, and a nail locating device is thus required.

FIG. 1 illustrates a conventional nail locating device 10 for locating a magnetically attractive nail that was driven into a non-magnetically attractive board. The nail locating device 10 includes a transparent casing 11 made of plastic and provided with a pivot shaft 15, and an indicating rod 12 disposed within the casing 11 and having an upper end pivoted to the pivot shaft 15. The indicating rod 12 has a bottom end provided with a magnet 13. The casing 11 has front and rear sides provided with aligned marks 14 that are aligned vertically with the pivot shaft 15.

Referring to FIG. 2, when the nail locating device 10 is used to locate an iron nail that was driven into a wooden board, the casing 11 is moved on a surface of the board so that the indicating rod 12 pivots in the casing 11 in the direction of the nail due to attraction of the magnet 13 to the nail. The casing 11 is moved by the operator until the indicating rod 12 is generally perpendicular to the wooden board, indicating that the nail is located on a line that passes through the aligned marks 14. A first indicating line (A) along the aligned marks 14 is then drawn on the board by the operator. Thereafter, the casing 11 is once again moved on the surface of the board, and the aforementioned procedure is repeated until a second indicating line (B) is obtained. The first and second indicating lines (A, B) intersect at a point (C) which is the location of the nail.

Although the conventional nail locating device 10 achieves the purpose of locating a magnetically attractive nail, such as an iron nail, on a non-magnetically attractive board, such as a wooden board, it suffers from the following drawbacks: Two intersecting indicating lines must be drawn before the nail can be located, thereby resulting in a relatively inconvenient and time-consuming locating operation. In addition, a pen element and a ruler are required to enable the operator to draw the indicating lines. Moreover, the surface of the board may be damaged or stained when drawing the straight lines on the board.

SUMMARY OF THE INVENTION

The main object of the present invention is to provide a nail locating device which permits location of a magnetically attractive nail that was driven into a non-magnetically attractive board in a fast and convenient manner.

Accordingly, the nail locating device of the present invention includes a seat, a coupling member and an indicating rod. The seat is adapted to be moved on a surface of the board and has an open upper end portion and an open lower end portion. The seat further has an intermediate portion between the upper and lower end portions and formed with a ball socket therein. The coupling member has a ball portion hinged to the seat in the ball socket. The indicating rod is received in the seat and extends from the upper end portion, through the ball portion of the coupling member, and into the lower end portion of the seat. The indicating rod has a bottom end provided with a magnet that is adapted to be attracted to the nail such that the indicating rod pivots in the seat due to attraction of the magnet to the nail in order to indicate the location of the nail in the board.

BRIEF DESCRIPTION OF THE DRAWINGS

Other features and advantages of the present invention will become apparent in the following detailed description of the preferred embodiment with reference to the accompanying drawings, in which.

DETAILED DESCRIPTION OF THE PREFERRED EMBODIMENT

Figure 1:
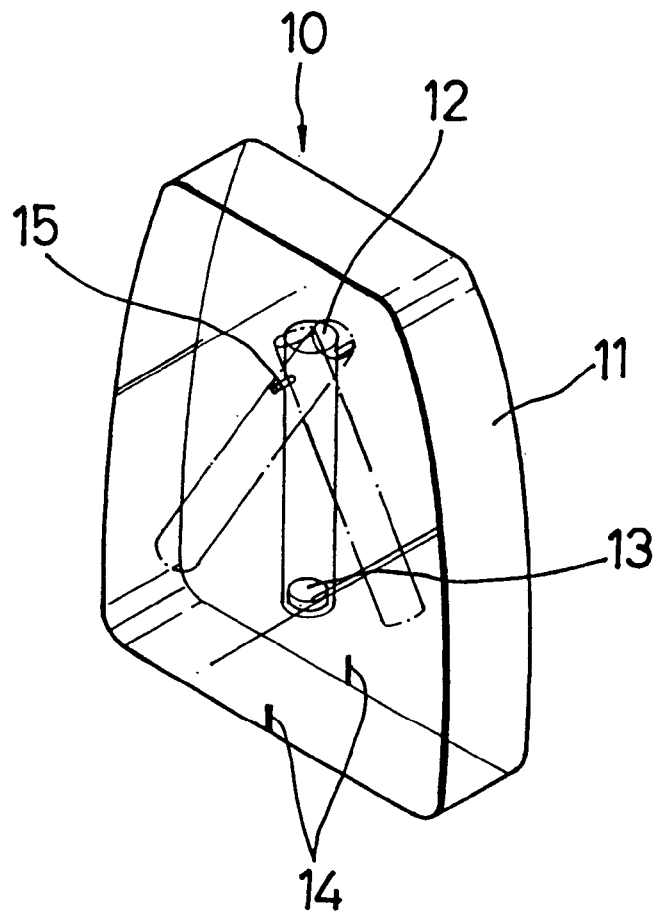
FIG. 1 is a perspective view of a conventional nail locating device.
Figure 2:
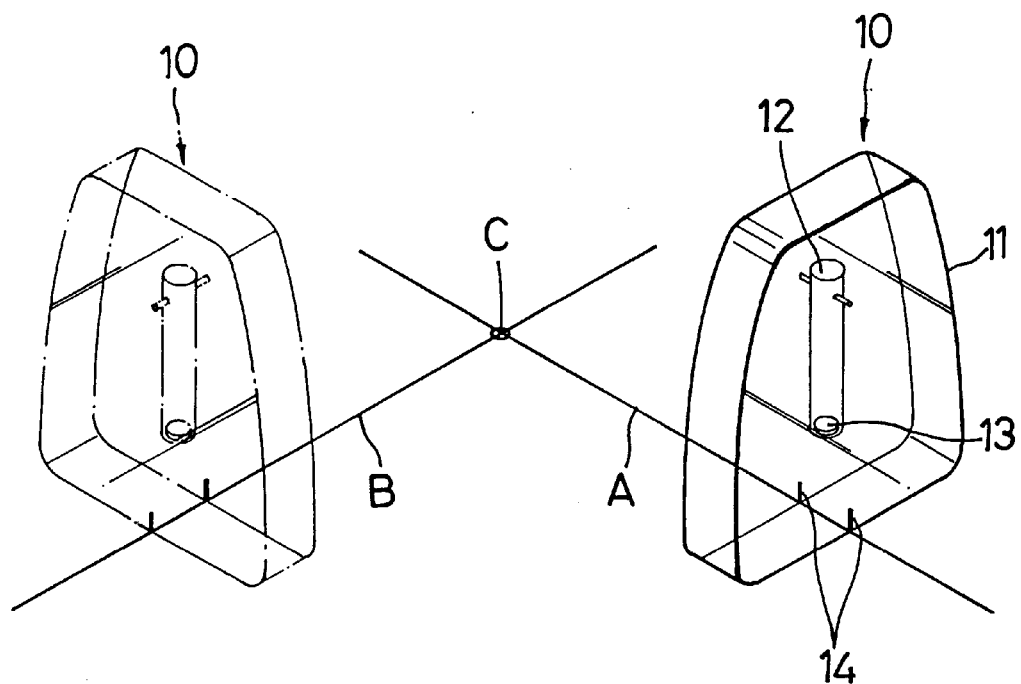
FIG. 2 illustrates how the conventional nail locating device is used when locating a magnetically attractive nail that was driven into a non-magnetically attractive board.
Figure 3:
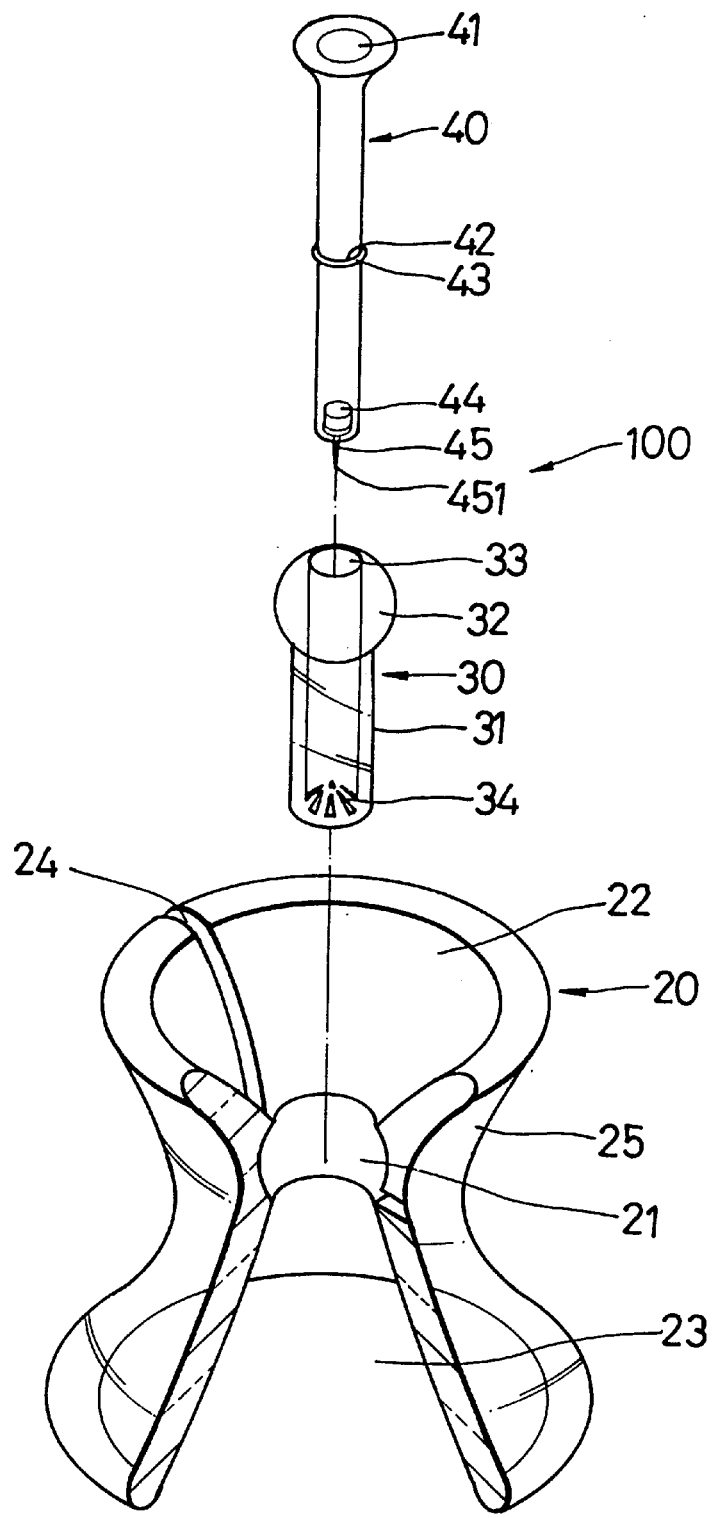
FIG. 3 is an exploded perspective view of a preferred embodiment of a nail locating device of the present invention.
Figure 4:
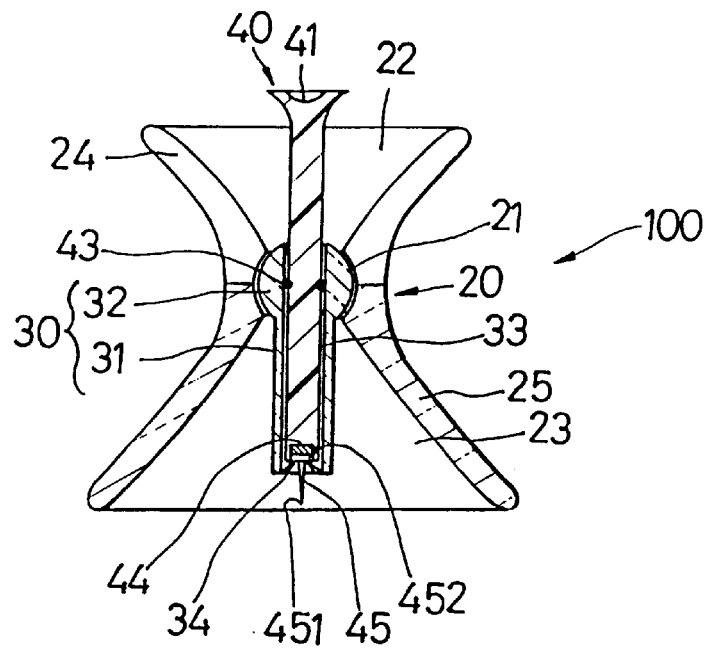
FIG. 4 is a vertical sectional view of the preferred embodiment.

Referring to FIGS. 3 and 4, the preferred embodiment of the nail locating device 100 of this invention is shown to include a seat 20, a coupling member 30 and an indicating rod 40.

The seat 20 is made of a transparent resilient material, and has an annular surrounding wall 25 with an upper section that diverges upwardly to define an open upper end portion 22, a lower section that diverges downwardly to define an open lower end portion 23, and an intermediate section between the upper and lower section and that defines a restricted intermediate portion having a ball socket 21 formed therein. The ball socket 21 is communicated with the upper and lower end portions 22, 23. The upper section of the surrounding wall 25 is formed with two opposite axial slits 24 which extend to the ball socket 21 in the intermediate portion.

The coupling member 30 is also made of a transparent resilient material, and includes a ball portion 32 and a tubular sleeve portion 31 extending downwardly from the ball portion 32. The ball portion 32 is hinged to the seat 20 in the ball socket 21, and the sleeve portion 31 extends into the lower end portion 23 of the seat 20. In assembly, the ball portion 32 can be easily forced into the ball socket 21 via the upper end portion 22 due to the presence of the axial slits 24 which impart resilience to the intermediate portion of the seat 20. The coupling member 30 has an axial hole 33 formed through the ball portion 32 and the sleeve portion 31. The coupling member 30 is further provided with a plurality of spring leaves 34 that extend radially inward from a bottom end of the sleeve portion 31 and that have upturned distal ends.

The indicating rod 40 is received in the seat 20 and extends from the upper end portion 22, through the ball portion 32 of the coupling member 30, and into the sleeve portion 31 of the coupling member 30 and the lower end portion 23 of the seat 20. The coupling member 30 thus couples the indicating rod 40 to the seat 20 so that the indicating rod 40 is pivotable in the seat 20 together with the coupling member 30 via the ball-and-socket joint formed between the coupling member 30 and the seat 20. The indicating rod 40 has a top end projecting outwardly and upwardly of the upper end portion of the seat 20 and formed with an indented depressing portion 41. The indicating rod 40 further has a bottom end provided with a magnet 44 and a marking element, such as a pressing nail 45 of high hardness. The pressing nail 45 has a head portion 452 mounted on the bottom end of the indicating rod 40 below the magnet 44, and a tip 451 that extends downwardly. The upturned distal ends of the spring leaves 34 abut against the head portion 452 of the pressing nail 45 such that the tip 451 of the pressing nail 45 projects downwardly and outwardly of the sleeve portion 31 past the spring leaves 34. The indicating rod 40 further has an intermediate section 42 provided with a friction ring 43 that is sleeved therearound. The friction ring 43 is in friction contact with an inner surface of the coupling member 30 for retaining the indicating rod 40 on the coupling member 30.

Figure 6:
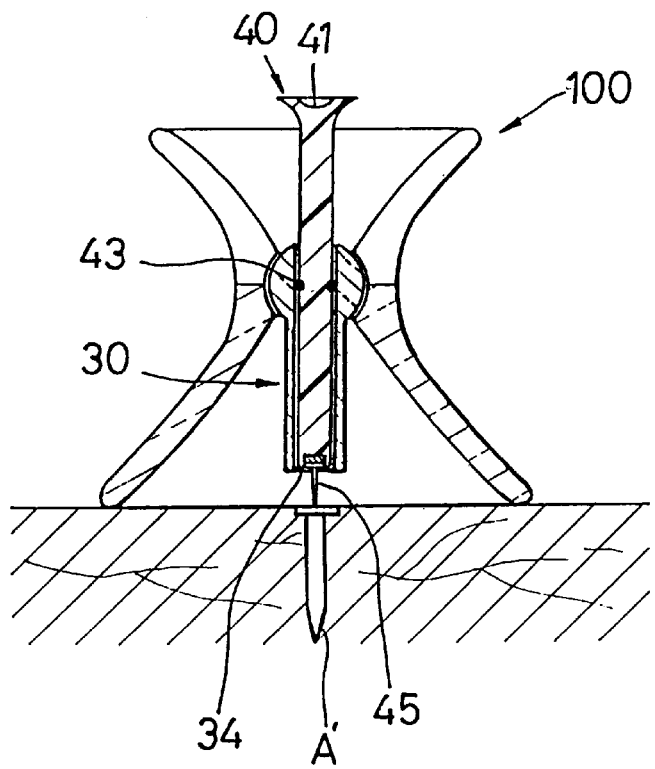
FIG. 6 is another vertical sectional view showing the preferred embodiment when an indicating rod thereof is depressed for making a mark on the board after the nail is located.
Figure 5:
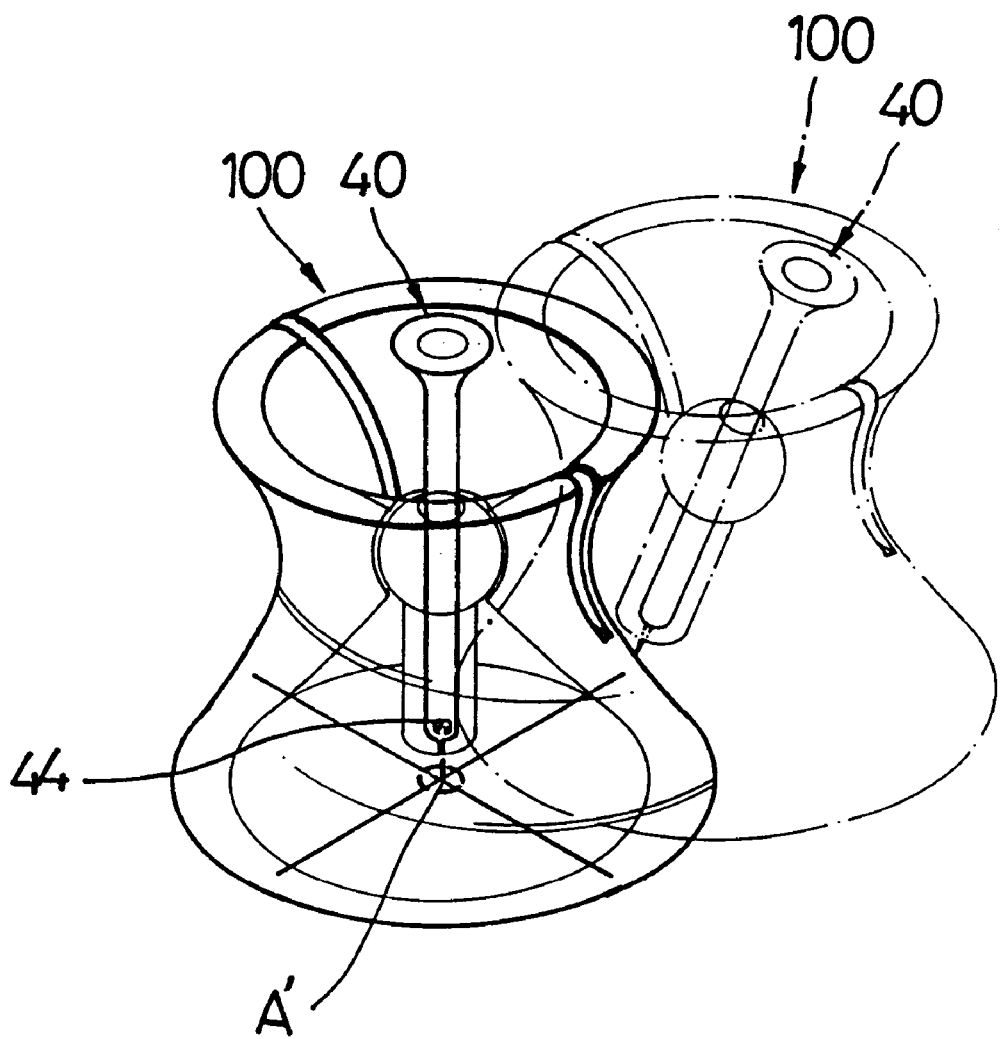
FIG. 5 is a schematic view illustrating the preferred embodiment in use.

Referring to FIGS. 4 and 5, when the nail locating device 100 of the preferred embodiment is used to locate a magnetically attractive nail (A') that was driven into a non-magnetically attractive board, the seat 20 is moved on a surface of the board so that the indicating rod 40 pivots in the seat 20 due to attraction of the magnet 44 to the nail (A'). The seat 20 is then moved by the operator until the indicating rod 40 is generally perpendicular to the surface of the board, indicating that the nail (A') is located directly below the indicating rod 40. In this situation, the depressing portion 41 of the indicating rod 40 is pressed downwardly by the operator, with the use of his finger, so that the pressing nail 45 can make a mark on the board, as shown in FIG. 6. When the applied force on the indicating rod 40 is released, the spring leaves 34 provide an upward biasing force to the indicating rod 40 to move the indicating rod 40 upwardly. The friction ring 43 imparts friction between the indicating rod 40 and the coupling member 30 so that the indicating rod 40 can be retained on the coupling member 30.

It has thus been shown that the indicating rod 40 of the nail locating device 100 of the present embodiment is pivotable in the seat 20 in two dimensions relative to the surface of the board. The nail (A') can thus be quickly located by conducting the above-described operating procedure once. In the illustrated embodiment, a marking element, i.e., the pressing nail 45, is provided on the bottom end of the indicating rod 40 for making a mark on the board after the nail (A') is located. Therefore, an additional pen element and a ruler are not required when the nail locating device 100 is in use.

With this invention thus explained, it is apparent that numerous modifications and variations can be made without departing from the scope and spirit of this invention. It is therefore intended that this invention be limited only as indicated in the appended claims.

I claim:

1. A nail locating device for locating a magnetically attractive nail that was driven into a non-magnetically attractive board, said nail locating device comprising:

a seat adapted to be moved on a surface of the board and having an open upper end portion and an open lower end portion, said seat having an intermediate portion between said upper and lower end portions and formed with a ball socket therein;

a coupling member having a ball portion hinged to said seat in said ball socket; and an indicating rod received in said seat and extending from said upper end portion, through said ball portion of said coupling member, and into said lower end portion of said seat, said indicating rod having a bottom end provided with a magnet that is adapted to be attracted to the nail such that said indicating rod pivots in said seat due to attraction of said magnet to the nail in order to indicate the location of the nail in the board.

2. The nail locating device according to claim 1, wherein said bottom end of said indicating rod is further provided with a marking element below said magnet, said indicating rod having a top end which projects outwardly and upwardly of said upper end portion of said seat to permit pressing of said indicating rod so that said marking element can make a mark on the board after the nail is located.

3. The nail locating device according to claim 2, wherein said coupling member further includes a tubular sleeve portion extending downwardly from said ball portion, said indicating rod extending into said sleeve portion, said sleeve portion being provided with spring means for biasing said indicating rod upwardly.

4. The nail locating device according to claim 3, wherein said marking element is a pressing nail with a head portion mounted on said bottom end of said indicating rod, said spring means including a plurality of spring leaves that extend radially inward from a bottom end of said sleeve portion and that abut against said head portion of said pressing nail, said pressing nail further having a tip that projects downwardly and outwardly of said sleeve portion past said spring leaves.

5. The nail locating device according to claim 4, wherein said spring leaves have upturned distal ends that abut against said head portion of said pressing nail.

6. The nail locating device according to claim 3, wherein said indicating rod is provided with a friction ring therearound, said friction ring being in friction contact with said coupling member.

7. The nail locating device according to claim 1, wherein said seat has an annular surrounding wall with an upper section that diverges upwardly to define said upper end portion, a lower section that diverges downwardly to define said lower end portion, and an intermediate section between said upper and lower sections to define said intermediate portion.

8. The nail locating device according to claim 7, wherein said upper section of said surrounding wall is formed with at least one axial slit which extends to said intermediate portion so as to impart resilience to said intermediate section of said surrounding wall to facilitate forcing of said ball portion of said coupling member into said ball socket via said upper end portion of said seat.

9. The nail locating device according to claim 1, wherein said seat is made of a resilient material.

10. The nail locating device according to claim 9, wherein said seat and said coupling member are transparent.

* * * * *